US009132613B2

United States Patent
Kawai et al.

(10) Patent No.: US 9,132,613 B2
(45) Date of Patent: *Sep. 15, 2015

(54) GAS BARRIER LAMINATE AND METHOD OF PRODUCING THE SAME

(75) Inventors: Kashiko Kawai, Kanagawa (JP); Yusuke Obu, Kanagawa (JP); Tomohiro Miyai, Kanagawa (JP); Shunya Nangou, Kanagawa (JP); Nan Zhang, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 13/989,595

(22) PCT Filed: Dec. 19, 2011

(86) PCT No.: PCT/JP2011/079364
§ 371 (c)(1),
(2), (4) Date: May 24, 2013

(87) PCT Pub. No.: WO2012/086589
PCT Pub. Date: Jun. 28, 2012

(65) Prior Publication Data
US 2013/0273374 A1   Oct. 17, 2013

(30) Foreign Application Priority Data
Dec. 24, 2010   (JP) .................. 2010-288712

(51) Int. Cl.
| | |
|---|---|
| *B32B 27/40* | (2006.01) |
| *B05D 5/00* | (2006.01) |
| *B32B 27/08* | (2006.01) |
| *C08J 7/04* | (2006.01) |

(52) U.S. Cl.
CPC . *B32B 27/08* (2013.01); *B05D 5/00* (2013.01); *C08J 7/04* (2013.01); *C08J 7/042* (2013.01); *Y10T 428/31547* (2015.04); *Y10T 428/31551* (2015.04); *Y10T 428/31573* (2015.04)

(58) Field of Classification Search
CPC ........ B32B 27/08; B32B 27/30; B32B 27/40; B32B 2250/02; B32B 2307/7244; C09J 7/04; C09J 7/042; C09J 7/08; C08K 5/0091; C08K 5/41; C08K 5/51; B05D 5/00
USPC .................................... 428/424.2; 427/393.5
See application file for complete search history.

(56) References Cited

U.S. PATENT DOCUMENTS

| | | | |
|---|---|---|---|
| 8,211,519 B2 | 7/2012 | Obu et al. | |
| 2010/0015449 A1 | 1/2010 | Obu et al. | |

(Continued)

FOREIGN PATENT DOCUMENTS

| | | |
|---|---|---|
| EP | 1614532 | 1/2006 |
| JP | 2002-240207 | 8/2002 |

(Continued)

OTHER PUBLICATIONS

International Search Report issed Mar. 6, 2012 in PCT/JP2011079364.

(Continued)

*Primary Examiner* — Thao T Tran
(74) *Attorney, Agent, or Firm* — Greenblum & Bernstein, P.L.C.

(57) ABSTRACT

A gas barrier laminate having an undercoating (A) which comprises a main resin, an isocyanate type curing agent and an alkaline compound of a polyvalent metal; and a barrier layer (B) of a polycarboxylic acid polymer forming an ionic crosslinking due to the polyvalent metal among the carboxyl groups; formed on at least one surface of a plastic base material (P), wherein a region (b) free of the alkaline compound of the polyvalent metal is formed in the undercoating (A) on the side of the barrier layer (B), the content of nitrogen in the region (b) being larger than the content of nitrogen in the undercoating (A) other than the region (b), the gas barrier laminate having excellent gas barrier property, retort resistance, producibility as well as excellent flexibility without developing interlayer peeling even if it is folded and featuring excellent interlayer adhesion.

10 Claims, 3 Drawing Sheets

(56) References Cited

U.S. PATENT DOCUMENTS

| | | |
|---|---|---|
| 2011/0091743 A1 | 4/2011 | Obu et al. |
| 2011/0200836 A1 | 8/2011 | Obu et al. |
| 2012/0219806 A1 | 8/2012 | Miyai et al. |
| 2012/0238696 A1* | 9/2012 | Obu et al. .................... 524/590 |

FOREIGN PATENT DOCUMENTS

| | | |
|---|---|---|
| JP | 2003-171419 | 6/2003 |
| JP | 2007-106046 | 4/2007 |
| JP | 2007-313758 | 12/2007 |
| JP | 2008-169303 | 7/2008 |
| JP | 2008-238475 | 10/2008 |
| JP | 2009-190216 | 8/2009 |
| WO | 2009/041500 | 4/2009 |

OTHER PUBLICATIONS

Search report from E.P.O., mail date is Jul. 25, 2014.

* cited by examiner

GAS BARRIER LAMINATE AND METHOD OF PRODUCING THE SAME

TECHNICAL FIELD

This invention relates to a gas barrier laminate and a method of producing the same. More specifically, the invention relates to a gas barrier laminate having excellent oxygen barrier property, flexibility and interlayer adhesion and to a method of efficiently producing the gas barrier laminate.

BACKGROUND ART

A variety of materials have heretofore been proposed and, particularly, polyvinylidene chloride, polyacrylonitrile and ethylene/vinyl alcohol copolymer have been known as gas barrier resins. From the standpoint of environmental problems, however, it is a trend to refrain from using the polyvinylidene chloride and polyacrylonitrile. The ethylene/vinyl alcohol copolymer, on the other hand, has gas barrier property that greatly varies depending on the humidity, i.e., has a problem of a decrease in the gas barrier property under highly humid conditions.

In order to impart gas barrier property to the packing materials, there has been known a method of using films obtained by depositing an inorganic material on the surface of a base material. Such films, however, are very costly and involve problems in regard to flexibility of the vapor-deposited film and adhesiveness to the base material.

In order to solve the above problems, there have been proposed a gas barrier resin composition obtained by reacting a polycarboxylic acid polymer, a crosslinking agent having 2 to 4 functional groups that react with the carboxyl groups, and metal ions of a valency of two or more so that the polycarboxylic acid polymer forms crosslinked portions due to the crosslinking agent and crosslinked portions due to the metal ions having a valency of two or more, the weight ratio of the polycarboxylic acid polymer and the crosslinking agent being from 99.9/0.1 to 65/35 (patent document 1); and a gas barrier film obtained by forming a gas barrier coating on at least one surface of a thermoplastic resin film, the coating being formed of a polyacrylic acid that is crosslinked with a crosslinking agent containing an epoxy compound having three or more epoxy groups per a molecule thereof, and the crosslinking agent being contained in an amount of 1 to 100 parts by mass per 100 parts by mass of the polyacrylic acid (patent document 2).

The gas barrier materials disclosed in the above patent documents 1 and 2 must be crosslinked to a high degree at a high temperature of not lower than 150° C. or by being heated for extended periods of time accompanied by such problems as seriously affecting the plastic base material, and requiring a dip treatment or a spray treatment at the time of ionic crosslinking with metal ions, lowering the productivity, and consuming large amounts of energy and water. Besides, the gas barrier materials are not still satisfactory in regard to flexibility and retort resistance.

As a gas barrier laminated film on which dry-printing can be effected at a relatively low temperature, further, there has been proposed a gas barrier laminated film comprising a layer (a) formed from a coating solution (A) containing a polycarboxylic acid polymer without heat treatment and a layer (b) formed from a coating solution (B) containing a water-soluble polyvalent metal salt and an aqueous resin, the layer (a) of the coating solution (A) and the layer (b) of the coating solution (B) forming at least a pair of lamination units abutting to each other (patent document 3).

The gas barrier laminated film disclosed in the above patent document 3 can be dry-printed at a relatively low temperature; i.e., the gas barrier laminated film is obtained without affecting the base material. With this laminated film, however, the polycarboxylic acid polymer that is applied first is fixed and does not sufficiently migrate into the layer (a) of the polyvalent metal layer. Therefore, the crosslinking with polyvalent metal ions is not attained to a sufficient degree, and the gas barrier property is not still satisfactory unless the ionic crosslinking ratio is enhanced by employing a dip treatment or a spray treatment which is the conventional method as the treatment after the printing.

The present inventors have, further, proposed a gas barrier material having a barrier layer comprising a polycarboxylic acid polymer, the surface layer of the barrier layer forming a chemical bond stemming from an isocyanate group, and the content of nitrogen in the surface layer being at least 1 atom % or more per the total amount of carbon, oxygen and nitrogen (patent document 4).

The above gas barrier material is obtained by applying a gas barrier layer-forming coating material containing a high hydrogen-bonding polymer onto an isocyanate compound-containing layer that has been formed in advance and, thereafter, vaporizing the solvent in the coating material so that a surface layer forming a chemical bond stemming from the isocyanate group is formed on the barrier layer. Therefore, the gas barrier material offers an excellent effect of forming an anti-blocking layer with the isocyanate compound-containing layer as an anchoring layer in addition to exhibiting excellent gas barrier property, retort resistance and producibility.

PRIOR ART DOCUMENTS

Patent document 1: JP-A-2003-171419
Patent document 2: JP-A-2002-240207
Patent document 3: JP-A-2007-313758
Patent document 4: International Laid-Open No. 2009/41500

OUTLINE OF THE INVENTION

Problems that the Invention is to Solve

However, the above gas barrier member was not still fully satisfactory in regard to close adhesion among the layers, i.e., among the plastic base member/anchor coating/barrier layer. Namely, if the isocyanate compound migrates in large amounts into the barrier layer, the amount of the isocyanate compound decreases in the interfaces among the barrier layer/anchor coating or plastic base material/anchor coating. Therefore, the isocyanate compound is used in only decreased amounts for the interfacial reaction with the carboxyl groups of the polycarboxylic acid polymer or with the functional groups such as hydroxyl groups contained in the plastic base material, or is used in decreased amounts for producing electric cohesive force among the polar groups in the interfaces. Accordingly, the interlayer adhesion may decrease.

It is, therefore, an object of the present invention to provide a gas barrier laminate having an undercoating (A) which comprises a main resin, an isocyanate type curing agent and an alkaline compound of a polyvalent metal; and a barrier layer (B) of a polycarboxylic acid polymer forming an ionic crosslinking due to the polyvalent metal among the carboxy groups; formed on at least one surface of a plastic base material, the gas barrier laminate having excellent gas barrier property, retort resistance, producibility as well as excellent flexibility without developing interlayer peeling even if it is folded and featuring excellent interlayer adhesion.

Another object of the invention is to provide a method of producing a gas barrier laminate having excellent adhesion among the layers of base material, anchor coating and barrier layer, gas barrier property, retort resistance and flexibility based on only the heating conducted at a low temperature for a short period of time through a decreased number of simplified steps maintaining good efficiency.

Means for Solving the Problems

According to the present invention, there is provided a gas barrier laminate having an undercoating (A) which comprises a main resin, an isocyanate type curing agent and an alkaline compound of a polyvalent metal; and a barrier layer (B) of a polycarboxylic acid polymer forming an ionic crosslinking due to the polyvalent metal among the carboxyl groups; formed on at least one surface of a plastic base material, wherein a region (b) free of the alkaline compound of the polyvalent metal is formed in the undercoating (A) on the side of the barrier layer (B), the content of nitrogen in the region (b) being larger than the content of nitrogen in the undercoating (A) other than the region (b).

In the gas barrier laminate of the present invention, it is desired that:
1. A region (a) free of the alkaline compound of the polyvalent metal is formed in the undercoating (A) on the side of the plastic base material, the content of nitrogen in the region (a) being larger than the content of nitrogen in the undercoating (A) other than the regions (b) and (a);
2. The content of nitrogen is not less than 2 atom % relative to the total amount of carbon, oxygen and nitrogen in the undercoating (A) other than the regions (a) and (b), and the content of nitrogen relative to the total amount of carbon, oxygen and nitrogen in the regions (a) and (b) is larger, by not less than 1 atom %, than the content of nitrogen in the undercoating (A) other than the regions (a) and (b);
3. Nitrogen is present in an amount of 1 to 14 atom % in the surface of the barrier layer (B) on the side opposite to the undercoating (A);
4. The main resin is a polyester polyol containing a metal element in the resin skeleton thereof, and the isocyanate type curing agent is a combination of a straight chain aliphatic isocyanate compound and an alicyclic isocyanate compound having an alicyclic ring structure in the skeleton thereof;
5. The straight chain aliphatic isocyanate compound and the alicyclic isocyanate compound are at a weight ratio of 60:40 to 15:85;
6. The straight chain aliphatic isocyanate compound has an isocyanurate structure;
7. The polycarboxylic acid polymer is a poly(meth)acrylic acid or a partly neutralized product thereof; and
8. The alkaline compound of the polyvalent metal comprises at least one of a carbonate of calcium or magnesium, or a hydroxide thereof.

According to the present invention, there is, further, provided a packing material comprising the above gas barrier laminate and having a plastic base material on the barrier layer of the gas barrier laminate on the side opposite to the undercoating.

According to the present invention, there is, further, provided a method of producing a gas barrier laminate by applying a coating composition which comprises a main resin, an isocyanate type curing agent which includes a straight chain aliphatic isocyanate compound and an alicyclic isocyanate compound having an alicyclic ring structure in the skeleton thereof, and an alkaline compound of a polyvalent metal, onto a plastic base material, volatilizing the solvent by the heat treatment and, thereafter, applying thereon a coating material that contains a polycarboxylic acid polymer.

In the method of producing the gas barrier laminate of the present invention, it is desired that the aliphatic isocyanate compound has a glass transition temperature (Tg) of not higher than −20° C. and a number average molecular weight (Mn) of not more than 1200, and that the alicyclic isocyanate compound has a glass transition temperature (Tg) of not lower than 50° C. and a number average molecular weight (Mn) of not less than 400.

Effects of the Invention

According to the present invention, a region (b) free of the alkaline compound of the polyvalent metal is formed in the undercoating on the side of the barrier layer, the content of nitrogen in the region (b) being larger than the content of nitrogen in the undercoating other than the region (b) making it possible to provide a gas barrier laminate having excellent flexibility and very excellent adhesion among the layers.

Further, the gas barrier laminate of the invention exhibits excellent gas barrier property, water resistance, makes it possible to attain excellent gas barrier property even after subjected to high-temperature and high-humidity conditions such as of retort sterilization and, therefore, to impart retort resistance.

Further, the method of producing the gas barrier laminate of the invention requires no dip treatment or spray treatment that was so far necessary for crosslinking the carboxyl groups of the polycarboxylic acid polymer with multivalent metal ions, and the number of the steps can be decreased. Moreover, the carboxyl groups of the polycarboxylic acid polymer can be crosslinked like when the dip treatment or the spray treatment is conducted, and the crosslinked structure can be easily formed based on only the heating conducted at a low temperature for a short period of time without adversely affecting the plastic base material making it possible to produce a gas barrier material in a shortened period of production time requiring decreased amount of energy maintaining good productivity.

Further, upon using, as an isocyanate type curing agent, the straight chain aliphatic isocyanate compound in combination with the alicyclic isocyanate compound having an alicyclic ring structure in the skeleton thereof, that have different compatibilities to the main resin, it is allowed to control the behavior of the isocyanate compound in the undercoating from bleeding out (from migrating into the surface layer) and, therefore, to easily form the above-mentioned region (b).

The straight chain aliphatic isocyanate compound having a high compatibility to the main resin diffuses homogeneously in the undercoating and partly migrates into the barrier layer (B) so as to bleed out on the surface of the barrier layer. On the other hand, the alicyclic isocyanate compound having an alicyclic ring structure in the skeleton and having a low compatibility to the main resin bleeds out in the undercoating on the side of the barrier layer and on the side of the base material and is, specifically, concentrated on the side of the barrier layer. Like the straight chain aliphatic isocyanate compound having a high compatibility, the alicyclic isocyanate compound partly migrates into the barrier layer (B) and bleeds out on the surface of the barrier layer. Here, the alicyclic isocyanate compound having a low compatibility is concentrated on the side of the barrier layer enabling the above-mentioned region (b) to be easily formed.

MODE FOR CARRYING OUT THE INVENTION (Gas Barrier Laminates)

Figure 1:
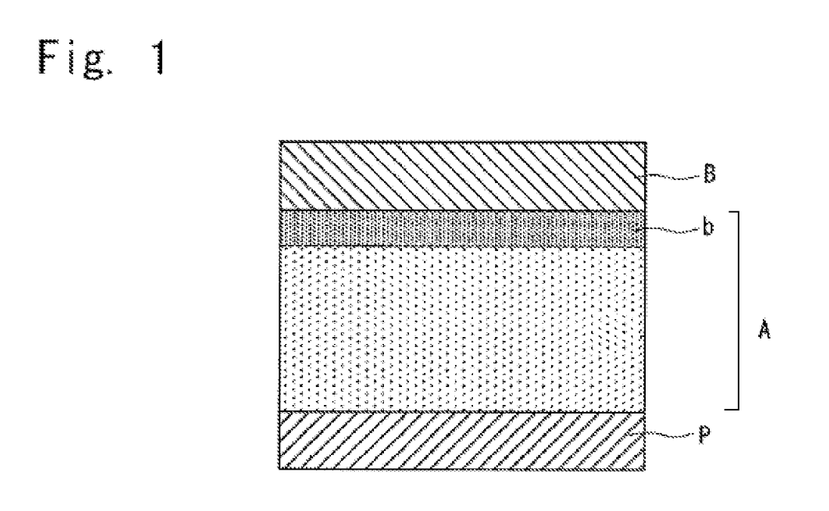
FIG. 1 is a view showing in cross section the structure of a gas barrier laminate of the present invention.

The gas barrier laminate of the present invention of which the sectional structure is shown in FIG. 1 has an undercoating (A) that comprises a main resin, an isocyanate type curing agent and an alkaline compound of a polyvalent metal; and a barrier layer (B) of a polycarboxylic acid polymer forming ionic crosslinking due to the polyvalent metal among the carboxyl groups; formed on at least one surface of a plastic base material (P), wherein an important feature resides in that a region (b) free of the alkaline compound of the polyvalent metal is formed in the undercoating (A) on the side of the barrier layer (B), the content of nitrogen in the region (b) being larger than the content of nitrogen in the undercoating (A) other than the region (b).

When the undercoating (A) is being formed, the alicyclic isocyanate compound having a low compatibility to the main resin bleeds out in the undercoating (A) on the side of the base material and on the side of the barrier layer (B). Here, the alicyclic isocyanate compound tends to be concentrated, specifically, on the side of the barrier layer (B) due to the flow caused by the volatilization of solvent in the coating material.

The present invention controls the behavior of the isocyanate compound that stems from its chemical structure to form the region (b) of a large nitrogen content in the undercoating (A) making it possible to greatly improve the interlayer adhesion between the undercoating (A) and the barrier layer (B).

Upon applying the polycarboxylic acid polymer onto the undercoating (A), the alkaline compound of the polyvalent metal in the undercoating (A) migrates into the layer of the polycarboxylic acid polymer and quickly dissolves therein to release polyvalent metal ions that help form metal ionic crosslinked structure among the carboxyl groups of the polycarboxylic acid polymer to form the barrier layer (B). Therefore, the alkaline compound of the polyvalent metal that used to be present in the region (b) of the undercoating (A) on the side of the barrier layer (B) in the gas barrier laminate, has now been consumed by the migration of the polyvalent metal ions into the barrier layer (B), and no alkaline compound is present in the region (b).

Thus, there is formed the region (b) that contains no alkaline compound of the polyvalent metal but contains nitrogen more than in the layer (A) other than the region (b). The thickness of the region (b) is determined by the blending ratio of the straight chain aliphatic isocyanate compound and the alicyclic isocyanate compound, by the blending ratio of the main resin and the curing agent, by the amount of feeding the alkaline compound of the polyvalent metal and by the thickness of the undercoating, and cannot be exclusively specified but should, preferably, be at least not less than 0.05 μm.

Figure 2:
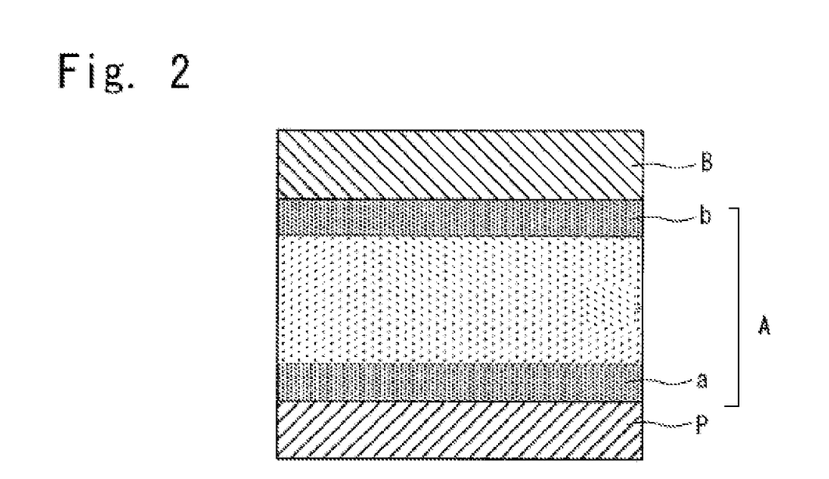
FIG. 2 is a view showing in cross section another structure of the gas barrier laminate of the present invention.

As shown in FIG. 2, the gas barrier laminate of the present invention, further, forms, together with the above region (b), a region (a) in the undercoating (A) on the side of the plastic base material (P), the region (a) containing no alkaline compound of the polyvalent metal but containing nitrogen more than in the undercoating (A) other than the regions (b) and (a). This also improves the interlayer adhesion between the undercoating (A) and the plastic base material (P) like that of the presence of the above region (b). Like that of the region (b), the thickness of the region (a) is determined by the blending ratio of the straight chain aliphatic isocyanate compound and the alicyclic isocyanate compound, by the blending ratio of the main resin and the curing agent, by the amount of feeding the alkaline compound of the polyvalent metal and by the thickness of the undercoating, and cannot be exclusively specified but should, preferably, beat least not less than 0.01 μm.

In the gas barrier laminate of the invention, it is desired that the content of nitrogen is not less than 2 atom % relative to the total amount of carbon, oxygen and nitrogen in the undercoating (A) other than the regions (a) and (b), and the content of nitrogen relative to the total amount of carbon, oxygen and nitrogen in the regions (a) and (b) is larger, by not less than 1 atom %, than the content of nitrogen in the undercoating (A) other than the regions (a) and (b).

Figure 3:
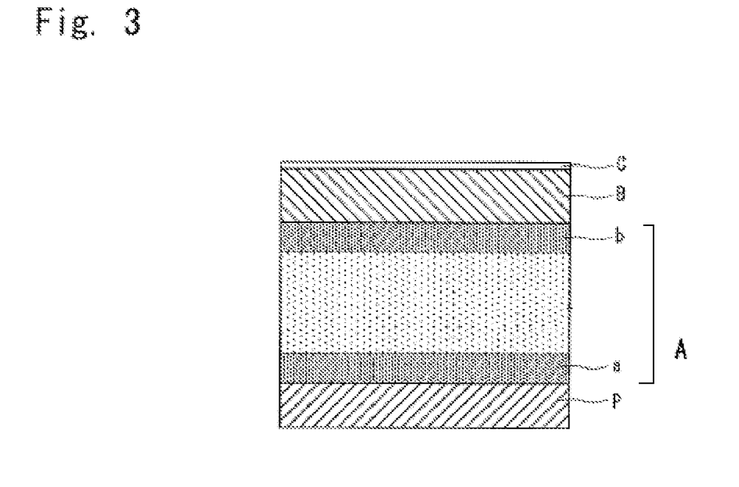
FIG. 3 is a view showing in cross section a further structure of the gas barrier laminate of the present invention.

As described above, upon controlling the affinity of the coating material containing the polycarboxylic acid polymer relative to the solvent, the isocyanate compound in the undercoating (A) migrates into the coating material containing the polycarboxylic acid polymer, bleeds out on the surface of the barrier layer (migrates into the surface layer) and, further, undergoes the reaction with alcohol or water in the coating material (B') containing the polycarboxylic acid polymer that forms the barrier layer (B) or with the polycarboxylic acid polymer, or the isocyanate derivatives react with one another, as represented by the following chemical formulas, to form an isocyanate compound-containing layer (C) having a chemical bond stemming from the isocyanate group that interacts with the barrier layer (B) on the surface of the barrier layer (B) on the side opposite to the undercoating (A). It is desired that nitrogen is present in an amount of 1 to 14 atom % in the isocyanate compound-containing layer (see FIG. 3). If the nitrogen content is larger than the above range, the interlayer adhesion decreases. If the nitrogen content is smaller than the above range, on the other hand, the anti-blocking effect is not obtained as desired. Here, the layer (C) having a thickness of not less than 0.01 μm is enough for attaining the anti-blocking property to a sufficient degree.

In the invention, the regions (a) and (b) containing no alkaline compound of polyvalent metal can be confirmed and their thicknesses can be estimated by observing the cross section of a sample that is cut aslant by using a TEM (transmission electron microscope), and the contents of carbon, oxygen and nitrogen atoms in the regions (a) and (b) and in the layers (A) and (C) can be measured by the surface analysis by using an XPS (X-ray photoelectronic spectroscopy).

[Chemical 1]

(Undercoating)

In the gas barrier laminate of the invention, the undercoating comprises the main resin, isocyanate type curing agent and alkaline compound of a polyvalent metal, that will be described later. Here, it is particularly desired that the main resin is a polyester polyol containing a metal element in the resin skeleton thereof and that the isocyanate type curing agent is a combination of a straight chain aliphatic isocyanate compound and an alicyclic isocyanate compound having an alicyclic ring structure in the skeleton thereof.

That is, the polyester polyol which is the main resin and contains a metal element in the resin skeleton thereof, works by itself as an anchor coating enabling the undercoating (A) to be laminated on the plastic base material maintaining good adhesion and, due to the metal element contained therein, swells well in a water-containing solvent. Therefore, upon applying a coating material containing the polycarboxylic acid polymer, the polyester polyol swells and permits polyvalent metal ions present in the undercoating (A) to migrate well into the barrier layer.

Further, upon using, as the isocyanate type curing agent, the straight chain aliphatic isocyanate compound in combination with the alicyclic isocyanate compound having an alicyclic ring structure in the skeleton thereof, that have different compatibilities to the main resin, it is allowed to control the bleeding-out behavior of the isocyanate compound in the undercoating.

Namely, the straight chain aliphatic isocyanate compound has a high compatibility to the main resin and, therefore, diffuses homogeneously in the undercoating. On the other hand, the alicyclic isocyanate compound having the alicyclic ring structure in the skeleton thereof has a poor compatibility to the main resin and, therefore, bleeds out in the undercoating toward the side of the barrier layer and toward the side of the base material and is, specifically, concentrated on the side of the barrier layer. Therefore, the nitrogen content in the region (b) becomes larger than the nitrogen content in the undercoating (A) other than the region (b) and, preferably, other than the regions (b) and (a).

[Main Resin]

As the main resin used for the undercoating of the present invention, it is desired to use a non-aqueous resin which contains a metal element in the resin skeleton thereof, the resin component being, preferably, such as of urethane, epoxy, acrylic or polyester. By introducing a metal base into a monomer that constitutes the polymer, it is allowed to contain a metal element in the resin skeleton that is formed. Here, the word "non-aqueous resin" is a concept which excludes emulsion or latex dispersed in a water-containing solvent or excludes water-soluble resin. This effectively prevents a decrease in the mechanical strength of the undercoating (A) that is caused by an excess of swelling upon coming in contact with the water-containing solvent.

The metal base to be preferably introduced into the monomer of the resin should, desirably, have a polar functional group for improving the dispersion of the polyvalent metal, and its examples include a metal base of sulfonic acid and a metal base of phosphoric acid. As the metal element, further, there can be exemplified lithium Li, potassium K, sodium Na, magnesium Mg, calcium Ca, copper Cu and iron Fe. Particularly desirably, the metal element is a monovalent metal element. In the invention, it is specifically desired to introduce a sodium sulfonate.

In the invention, to attain excellent adhesion to the base material and to improve dispersion of the alkaline compound of the polyvalent metal, an isocyanate type curing agent is used. As the main resin for the isocyanate type curing agent, therefore, it is desired to use a polyester polyol, a polyether polyol or a polyol component thereof such as the one modified with an urethane. Therefore, an urethane bond is formed in the coating (A) to attain excellent adhesion to the base material and to enhance the dispersion of the alkaline compound of the polyvalent metal. If the weight of the isocyanate type curing agent necessary for reacting the hydroxyl groups of the polyol component is presumed to be one equivalent, it is desired that the isocyanate type curing agent is present in an amount of at least not less than 4 equivalents.

As the polyol component used for forming the urethane polymer, it is desired to use the polyester polyol or the one modified with the urethane. As the polyester polyol components, there can be exemplified polyester polyols obtained by reacting a polyvalent carboxylic acid, a dialkylester thereof or a mixture thereof with glycols or a mixture thereof.

The glass transition temperature of the polyester polyol is, preferably, −50° C. to 100° C. and, more preferably, −20° C. to 80° C. Further, the polyester polyol has a number average molecular weight of, preferably, 1,000 to 100,000 and, more preferably, 3,000 to 80,000.

As the polyvalent carboxylic acid, there can be exemplified aromatic polyvalent carboxylic acids, such as isophthalic acid, terephthalic acid and naphthalenedicarboxylic acid, and aliphatic polyvalent carboxylic acids, such as adipic acid, azelaic acid, sebacic acid and cyclohexanedicarboxylic acid.

As the glycol, there can be exemplified ethylene glycol, propylene glycol, diethylene glycol, butylene glycol, neopentyl glycol and 1,6-hexane diol.

In the invention, the non-aqueous resin containing a metal element in the resin skeleton thereof is obtained by copolymerizing the polyol component or the polyvalent carboxylic acid component with a component in which the metal base is introduced.

As the polyvalent carboxylic acid in which the metal base is introduced, there can be exemplified metal salts such as sulfoterephthalic acid, 5-sulfoisophthalic acid, 4-sulfonaphthalene-2,7-dicarboxylic acid, and 5[4-sulfophenoxy]isophthalic acid. Further, as the polyol in which the metal base is introduced, there can be exemplified such metal salts as 2-sulfo-1,4-butane diol, and 2,5-dimethyl-3-sulfo-2,5-hexane diol. Specifically preferred example is the 5-sodiumsulfoisophthalic acid.

It is desired that the component in which the metal base is introduced has been copolymerized in an amount of 0.01 to 10 mol %. If the amount thereof is smaller than the above range, the polyvalent metal ions cannot be sufficiently migrated. If the amount thereof is larger than the above range, on the other hand, the waterproof property tends to be deteriorated.

If the metal element is contained in the resin skeleton of the non-aqueous resin can be detected by, for example, the fluorescence X-ray spectroscopy of the starting resin.
(Measuring Conditions of the Fluorescence X-Ray Analyzer)
Instrument used: ZSX100e, manufactured by Rigaku Denki Co.
Measuring conditions: Object to be measured, Na—Kα ray
Measuring diameter, 30 mm
X-ray output, 50 kV-70 mA
Measuring time, 40 s
[Isocyanate Type Curing Agent]

As the isocyanate type curing agent used in the present invention as described above, it is specifically desired to use the straight chain aliphatic isocyanate compound in combination with the alicyclic isocyanate compound having the alicyclic ring structure in the skeleton thereof.

It is, further, desired that the straight chain aliphatic isocyanate compound and the alicyclic isocyanate compound are blended at a weight ratio of 60:40 to 15:85 and, specifically, 55:45 to 30:70. If the amount of the straight chain aliphatic isocyanate compound is smaller than the above range, a sufficiently large adhesiveness cannot be obtained. If the amount of the alicyclic isocyanate compound is smaller than the above range, further, it may become difficult to form the region (b).

As the straight chain aliphatic isocyanate, there can be exemplified tetramethylene diisocyanate, 1,6-hexamethylene diisocyanate, dodecamethylene diisocyanate and trimethylhexamethylene diisocyanate. Among them, the one having the isocyanurate structure is preferred. Concretely, there can be preferably used an isocyanurate isomer having a 1,6-hexamethylene diisocyanate as the structural unit.

Further, as the alicyclic isocyanate compound having the alicyclic ring structure in the skeleton thereof, there can be exemplified 1,3-cyclohexylene diisocyanate, 4-cyclohexylene diisocyanate, hydrogenated xylylene diisocyanate, lizine diisocyanate, isophorone diisocyanate, 4,4'-dicyclohexylmethane diisocyanate, and 3,3'-dimethyl-4,4'-dicyclohexylmethane diisocyanate. Among them, the isophorone diisocyanate and its derivatives can be preferably used.

As the straight chain aliphatic polyisocyanate compound and the alicyclic isocyanate compound, there can be also used polyfunctional polyisocyanate compounds such as isocyanurate derived from the above polyisocyanate monomer, biuret, and allophanate, or polyfunctional polyisocyanate compounds containing a terminal isocyanate group obtained by the reaction with a trifunctional or more highly functional polyol compound, such as trimethylolpropane and glycerin.

In the present invention, it is desired that the straight chain aliphatic isocyanate compound has a glass transition temperature (Tg) of not higher than −20° C. and a number average molecular weight (Mn) of not more than 1200 and, specifically, a glass transition temperature (Tg) of not higher than −40° C. and a number average molecular weight (Mn) of not more than 1100 from such a standpoint that it easily and homogeneously diffuses in the undercoating accompanying the volatilization of the solvent. Further, it is desired that the alicyclic isocyanate compound has a glass transition temperature (Tg) of not lower than 50° C. and a number average molecular weight (Mn) of not less than 400 and, specifically, a glass transition temperature (Tg) of not lower than 60° C. and a number average molecular weight (Mn) of not less than 500 from such a standpoint that it stays in the undercoating (A) on the side of the barrier layer and on the side of the plastic base material to easily form the regions (b) and (a).
[Alkaline Compound of Polyvalent Metal]

In the alkaline compound of the polyvalent metal used in the invention, it is desired that the surfaces of particles of the alkaline compound of the polyvalent metal have not been chemically treated from such a standpoint that the alkaline compound of the polyvalent metal migrates into the coating material containing the polycarboxylic acid polymer and quickly dissolves therein.

In the present invention, further, particles of the alkaline compound of the polyvalent metal often remain in the undercoating (A) of the gas barrier laminate other than the regions (a) and (b). Though dependent upon the amount of the particles that remain, the transparency of the gas barrier laminate often decreases to a slight degree if the primary grain size of the particles exceeds 0.5 µm. It is, therefore, desired that the alkaline metal particles of the polyvalent metal have a primary grain size of not more than 0.5 µm and, specifically, not more than 0.4 µm. The primary grain size of particles of the alkaline compound of the polyvalent metal can be found by observing a secondary electron image thereof by using a scanning type electron microscope.

There is no specific limitation on the polyvalent metal ions so far as they are capable of crosslinking the carboxyl groups of the polycarboxylic acid polymer, and there can be exemplified metal ions such as of alkaline earth metals (magnesium Mg, calcium Ca, strontium Sr, barium Ba, etc.), metals of the group 8 of periodic table (iron Fe, ruthenium Ru, etc.), metals of the group 11 of periodic table (copper Cu, etc.), metals of the group 12 of periodic table (zinc Zn, etc.), and metals of the group 13 of periodic table (aluminum Al, etc.) and, specifically, those having valencies of 2 to 3 and, preferably, divalent metal ions such as of calcium, magnesium and zinc. The metal ions can be used in one kind or in a combination of two or more kinds.

As the alkaline compound of the polyvalent metal, there can be exemplified hydroxides of the above metals (e.g., magnesium hydroxide, calcium hydroxide, etc.), carbonates (e.g., magnesium carbonate, calcium carbonate, etc.), and organic acid salts such as carboxylates (e.g., acetates such as zinc acetate, calcium acetate, or lactates such as zinc lactate, calcium lactate, etc.). From the standpoint of safety when used as a packing material for foods and that no by-product stays in the layer (B) when the crosslinking is formed with metal ions, however, it is, particularly, desired to use at least one of a carbonate or a hydroxide of calcium or magnesium.

In the coating composition (A') for forming the undercoating (A) used in the invention, it is desired that the alkaline compound of the polyvalent metal is contained in an amount of not less than 0.4 equivalents per the carboxyl groups of the polycarboxylic acid polymer in the solution (B') that will be described later calculated as metal atoms presuming that two carboxyl groups react per a polyvalent metal ion. For the use that is put to the retort sterilization, in particular, it is desired that the content thereof is not less than 0.6 equivalents to maintain the gas barrier property after the retort sterilization.

If the content of the alkaline compound of the polyvalent metal is less than the above range, the carboxylic acid polymer cannot be crosslinked to a sufficient degree and it becomes difficult to maintain the gas barrier property.

It is, further, desired that content of the resin component in the coating composition (A') is adjusted to be 15 to 80% by weight and, specifically, 20 to 60% by weight.

In the coating composition (A'), further, it is desired that the resin component is a non-aqueous resin which is prepared by using a solvent such as toluene, 2-butanone, cyclohexanone, Solvesso, isophorone, xylene, ethyl acetate or butyl acetate and, specifically, by using a low-boiling solvent so that the layer can be formed at a low temperature. The solvents may be used in a single kind or being mixed together, or the solutions of the components may be mixed together.

In addition to the above components, there can be, further, used a catalyst for accelerating the curing, filler, softening agent, anti-aging agent, stabilizer, adhesion accelerator, leveling agent, de-foaming agent, plasticizer, inorganic filler, tackifying resin, fibers, coloring agent such as pigment and usable time-extending agent that have been known per se.

(Barrier Layer)

The solution (B') for forming the barrier layer (B) is applied onto the undercoating (A) formed by using the above coating composition (A'), and is a solution in which the polycarboxylic acid polymer is dissociated as obtained by dissolving the polycarboxylic acid polymer in a solvent which contains at least water.

As the polycarboxylic acid polymer contained in the solution (B'), there can be exemplified homopolymers or copolymers of monomers having a carboxyl group, such as polyacrylic acid, polymethacrylic acid, polymaleic acid, polyitaconic acid and acrylic acid/methacrylic acid copolymer, and, specifically, polyacrylic acid and polymethacrylic acid. To accelerate the dissociated state of the polycarboxylic acid polymer in the solution, further, there may be used a partly neutralized product thereof.

The polycarboxylic acid polymer can be partly neutralized with a metal hydroxide such as sodium hydroxide or potassium hydroxide, or with ammonium.

Though there is no particular limitation, the degree of neutralization of the partly neutralized product is not more than 60% and, specifically, not more than 40% in terms of a molar ratio to the carboxyl groups. If the degree of neutralization exceeds the above range, the crosslinking is not formed to a sufficient degree with the ions of the alkaline compound of the polyvalent metal.

Though there is no particular limitation, it is desired that the polycarboxylic acid polymer has a "weight average molecular weight" in a range of 2,000 to 5,000,000 and, specifically, 10,000 to 1,000,000.

By using two isolation columns, i.e., "TSK G4000PWXL" and "TSK G3000PWXL" (manufactured by Tohso Co.) and using 50 mmols of a phosphoric acid aqueous solution as an eluent, the "weight average molecular weight" is measured at 40° C. and at a flow rate of 1.0 ml/min. and is found from a chromatogram and a calibration curve of a standard polycarboxylic acid polymer.

As the solvent for use as the solution (B'), there may be used water alone but, preferably, there is used a mixed solvent of water and an alcohol such as methanol, ethanol or isopropanol, a ketone such as 2-butanone or acetone, or an aromatic solvent such as toluene and, specifically, there is used a solvent having a boiling point lower than that of water in combination with water.

Preferably, there is used a solvent having good affinity to the undercoating (A) that contains the alkaline compound of the polyvalent metal from the standpoint of improving affinity to the undercoating (A) and accelerating the migration of the alkaline compound of the polyvalent metal into the solution (B'). When, for example, the urethane polymer is used, the solvent having good affinity to the undercoating (A) may, preferably, be an alcohol such as methanol, ethanol or isopropanol, or a ketone such as 2-butanone or acetone though dependent upon the resin component used for the coating composition (A').

When a mixed solvent of water and other solvent is used as the solvent, it is desired that the other solvent is used in an amount of not more than 1900 parts by weight and, specifically, in an amount of 5 to 900 parts by weight per 100 parts by weight of water.

The solution (B') may be blended with a crosslinking agent which reacts with unreacted carboxyl groups in the polycarboxylic acid polymer and forms a crosslinked structure by covalent bond. Namely, polyvalent metal ions migrated out of the undercoating (A) form a crosslinked structure with the carboxyl groups in the polycarboxylic acid polymer by ionic crosslinking. Here, the carboxyl groups that were not used for the crosslinking are crosslinked with the crosslinking agent to form the crosslinked structure having covalent bonds at the crosslinked portions thereby to improve the resistance against hot water of the gas barrier layer that is formed. When the resistance must be improved to withstand the severe treatment with hot water, the above crosslinked structure is relied upon to cope with the matter. Particularly desired examples of the crosslinking agent include a compound having two ring structures in which an ether bond is formed on carbon that forms a double bond relative to nitrogen, the ring structures including oxygen in the ether bond, i.e., the compound having two ring structures with an oxoimino group that has a group —N=C—O— or a part =C—O— in the ring, and an alicyclic epoxy compound containing an epoxy compound component which has an alicyclic group in the molecules and in which neighboring carbon atoms of the alicyclic group are forming an oxylane ring. By using these crosslinking agents, at least two ester bonds or amide ester bonds can be formed at the crosslinked part.

These crosslinking agents can be used in a single kind or in combination.

The crosslinking agent having one ring structure is not capable of forming the crosslinking whereas the crosslinking agent having three or more ring structures causes the structure of the crosslinked point to expand three dimensionally, which makes it difficult to form a densely crosslinked structure having excellent gas barrier property and is not desirable. It is, therefore, important that nitrogen and carbon are forming a double bond, that carbon is forming an ether bond, that an ether bond is formed on carbon that forms a double bond with nitrogen, that not only these conditions are existing alone by themselves but also that the crosslinking agent has two ring structures in which an ether bond is formed on carbon that is forming a double bond with nitrogen, the ring structure including oxygen in the ether bond.

The two ring structures possessed by the crosslinking agent may be of the same structure or different structures. Here, however, it is desired that at least one of them is an oxazoline group or a derivative thereof.

Concretely, from the standpoint of mechanical properties and color, it is desired that the crosslinked portion to be formed by the polycarboxylic acid polymer and the compound having two ring structures, is formed by the aliphatic chain. Among the above compounds, therefore, it is desired to use the one without the aromatic ring. Of them, 2,2'-bis(2-oxazoline) can be particularly preferably used.

Further, the alicyclic epoxy compound is a compound containing an epoxy compound component having an alicyclic group in the molecules thereof and in which neighboring carbon atoms of the alicyclic group are forming an oxylane ring. There can be used epoxy compounds having at least one epoxycycloalkyl group such as epoxycyclohexyl group or epoxycyclopentyl group in the molecules thereof in a single kind or in combination.

As the alicyclic epoxy compound, there can be exemplified an alicyclic epoxy compound having two epoxycyclohexyl groups in a molecule thereof as will be described later, as well as vinylcyclohexene monoepoxide, vinylcyclohexene diepoxide, bis(2,3-epoxycyclopentyl)ether and the like.

It is desired that the alicyclic epoxy compound used in the invention is a difunctional compound having two epoxy groups in a molecule thereof.

That is, when the difunctional alicyclic epoxy compound is used, the crosslinked structure three-dimensionally expands less than when the trifunctional or more highly functional alicyclic epoxy compound is used, and there can be formed a densely crosslinked structure having excellent gas barrier property. Further, the film that is formed is not so hard or brittle as that of when the polyfunctional alicyclic epoxy compound is used, making it possible to obtain excellent flexibility after the retort sterilization and, therefore, to obtain satisfactory retort resistance.

As the difunctional alicyclic epoxy compound, there can be preferably used an alicyclic epoxy compound having, in a molecule thereof, at least one epoxycycloalkyl group and, particularly, epoxycyclohexyl group that has an alicyclic epoxy group and, more preferably, an alicyclic group and in which neighboring carbon atoms of the alicyclic group are forming an oxysilane ring and, more preferably, the alicyclic epoxy compound having two epoxycyclohexyl groups.

It is desired that the solution (B') contains the polycarboxylic acid polymer in an amount of 2 to 60% by weight and, specifically, 4 to 40% by weight so that excellent gas barrier property can be obtained.

As required, further, the solution (B') contains the crosslinking agent in an amount of 0.1 to 20 parts by weight per 100 parts by weight of the polycarboxylic acid polymer. If the amount thereof is smaller than the above range, the resistance against hot water cannot be so much improved. If the amount thereof is larger than the above range, on the other hand, it becomes disadvantageous in economy, the carboxyl groups are not sufficiently crosslinked with polyvalent metal ions, and the gas barrier property cannot be improved.

The solution (B') can be prepared by preparing a polycarboxylic acid polymer solution by using a solvent which contains at least water and adding the crosslinking agent directly thereto if it can be dissolved therein, or can be prepared by adding the crosslinking agent to the solution in which it can be dissolved and to which the carboxylic acid polymer is to be added, i.e., separately dissolving the crosslinking agent in a solvent which is capable of maintaining the state of solution and, thereafter, adding it to the solution of the polycarboxylic acid polymer.

An acid or basic catalyst may be added to accelerate the reaction of the carboxyl groups in the polycarboxylic acid polymer with the crosslinking agent.

As the acid catalyst, there can be exemplified monovalent acids such as acetic acid, propionic acid, ascorbic acid, benzoic acid, hydrochloric acid, paratoluenesulfonic acid, and alkylbenzenesulfonic acid, and divalent or more highly valent acids such as sulfuric acid, sulfurous acid, phosphoric acid, phosphorous acid, hypophosphorous acid, polyphosphoric acid, pyrophosphoric acid, maleic acid, itaconic acid, fumaric acid, and polycarboxylic acid.

As the basic catalyst, there can be exemplified hydroxides of alkali metals or alkaline earth metals, such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n- or di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyaminetriethylamines such as diethylenetriamine, hydroxyethylaminoethylamine, ethylaminoethylamine and methylaminopropylamine.

The solution (B') may, further, contain an inorganic dispersion in addition to the above components. The inorganic dispersion works to block the water content from the exterior, to protect the gas barrier material and to, further, improve the gas barrier property and waterproof property.

The inorganic dispersion may assume any shape such as spherical shape, needle-like shape or laminar shape but is the one having wettability to the polycarboxylic acid polymer and the crosslinking agent that is added as required and, disperses well in the solution (b). From the standpoint of blocking the water, in particular, a silicate compound having a laminar crystal structure is, preferably, used, such as water-swelling mica or clay. It is desired that the inorganic dispersion has an aspect ratio of not less than 30 but not more than 5,000 from the standpoint of being dispersed in a laminar form to block the water.

It is desired that the inorganic dispersion is contained in an amount of 5 to 100 parts by weight per 100 parts by weight of the total amount of the polycarboxylic acid polymer and the crosslinking agent.

(Plastic Base Material)

In the invention, the plastic base material on which the undercoating (A) is to be applied will be any packing material of the form of film, sheet, bottle, cup, tray or can produced from a heat-formable thermoplastic resin through such means as extrusion forming, injection forming, blow forming, stretch-blow forming or press forming.

Preferred examples of the resin for constituting the plastic base material include olefin copolymers such as low-, intermediate- or high-density polyethylene, linear low-density polyethylene, polypropylene, ethylene/propylene copolymer, ethylene/butene copolymer, ionomer, ethylene/vinyl acetate copolymer and ethylene/vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10 and metaxylyleneadipamide; styrene copolymers such as polystyrene, styrene/butadiene block copolymer, styrene/acrylonitrile copolymer and styrene/butadiene/acrylonitrile copolymer (ABS resin); vinyl chloride copolymers such as polyvinyl chloride and vinyl chloride/vinyl acetate copolymer; acrylic copolymers such as polymethyl methacrylate and methyl methacrylate/ethyl acrylate copolymer; and polycarbonates.

These thermoplastic resins may be used alone or in the form of a blend of two or more kinds thereof. Further, the plastic base material may be constituted as a single layer or as a laminate of two or more layers formed by, for example, a simultaneous melt extrusion or lamination.

As required, further, the above melt-formable thermoplastic resin may be blended with one or two or more kinds of additives such as pigment, antioxidant, antistatic agent, ultraviolet ray absorber and lubricant in a total amount in a range of 0.001 parts to 5.0 parts per 100 parts by weight of the resin.

In order to reinforce the container, further, the thermoplastic resin may be blended with one or two or more kinds of fibrous reinforcing materials such as glass fiber, aromatic polyamide fiber, carbon fiber, pulp, cotton linter, or powdery reinforcing materials such as carbon black and white carbon, or flake-like reinforcing materials such as glass flake and aluminum flake in a total amount of 2 to 150 parts by weight per 100 parts by weight of the thermoplastic resin. As fillers, further, the thermoplastic resin may be blended with one or two or more kinds of heavy or soft calcium carbonate, mica, talc, kaolin, gypsum, clay, barium sulfate, alumina powder, silica powder and magnesium carbonate in a total amount of 5 to 100 parts by weight per 100 parts by weight of the thermoplastic resin according to a known recipe without any problem.

In order to improve the gas barrier property, further, the thermoplastic resin may be blended with a scale-like inorganic fine powder such as water-swelling mica and clay in a total amount of 5 to 100 parts by weight per 100 parts by weight of the thermoplastic resin according to a known recipe without any problem.

Similarly, to improve the gas barrier property, it is also allowable to form an inorganic thin film such as of silicon oxide or aluminum oxide on the plastic base material relying on a physical or chemical gas-phase vacuum evaporation method.

Further, the plastic base material may be a finally obtained film or sheet, or a formed article such as container, and the preformed article for forming the container may be provided with the coating thereof in advance. As the preformed article, there can be exemplified a cylindrical parison with or without bottom for biaxial stretch-blow forming, a pipe for forming a plastic can, a sheet for vacuum forming, compressed-air forming or plug-assisted forming, and a film for heat-sealed lid and for forming bags.

(Production of the Gas Barrier Laminates)

In preparing the gas barrier laminate of the present invention, first, the above coating composition (A') is applied onto at least one surface of the above plastic base material (P).

The amount of the coating composition (A') to be applied is determined depending upon the amounts of the resin component and the alkaline compound of the polyvalent metal in the coating composition (A') and cannot be definitely specified. The coating composition (A'), however, is applied in such an amount that the amount of the resin component is in a range of 0.02 to 5.0 g/m$^2$ and, specifically, 0.1 to 2.5 g/m$^2$ in the layer (A) that is formed and that the amount of the polyvalent metal ions is not less than 0.4 equivalents with respect to the carboxyl groups in the polycarboxylic acid polymer in the solution (B') that is applied. If the amount of the resin component is smaller than the above range, it becomes difficult to adhere the undercoating (A) to the plastic base material (P). Even if the amount of the resin component is larger than the above range, on the other hand, there is obtained no particular advantage but disadvantage in economy.

Though dependent upon the kind and the applied amount of the coating material, the undercoating (A) can be formed by applying the coating composition (A') onto the plastic base material (P) and drying it at a temperature of 50 to 200° C. for 0.5 seconds to 5 minutes and, specifically, at a temperature of 60 to 140° C. for 1 second to 2 minutes. The undercoating (A) is thus economically formed without affecting the plastic base material.

Next, the solution (B') is applied onto the undercoating (A) that is formed. It is desired that the amount of the polycarboxylic acid polymer or the amount of the free carboxyl groups contained in the resin composition in the solution (B') is at least not less than 150 KOH mg/g and, specifically, in a range of 250 to 970 KOH mg/g calculated as an acid value. Here, the acid value is an amount of the potassium hydroxide in milligrams necessary for neutralizing the acidic free functional groups contained in a gram of the resin as found by an ordinary method based on the neutralization titration with alkali. It is desired to apply the solution (B') in such an amount that the amount of the resin component only of before the ironic crosslinking is formed in the barrier layer (B) in dry state is in a range of 0.3 to 4.5 g/m$^2$ and, specifically, 0.5 to 3.0 g/m$^2$. If the applied amount thereof is smaller than the above range, barrier property is not obtained to a sufficient degree. Even if the amount of the resin component is larger than the above range, on the other hand, no particular advantage is obtained but disadvantage in economy.

Next, the solution (B') that is applied is heat-treated. Here, in the invention, the polyvalent metal ions in the undercoating (A) migrate into the solution (B') during the heat treatment, and a crosslinked structure is formed among the carboxyl groups in the polycarboxylic acid polymer. When a crosslinking agent is contained in the solution (B'), further, a crosslinked structure by covalent bond is also formed among the carboxyl groups in the polycarboxylic acid polymer due to the crosslinking agent.

It is desired that the solution (B') is heated under the conditions of a temperature of 30 to 140° C. and, specifically, 40 to 120° C. for 0.1 second to 1 minute and, more preferably, for 1 second to 30 seconds.

The above coating composition (A') and the solution (B') can be applied, dried and heat-treated in a customary manner.

Though not limited thereto only, the application is carried out by, for example, spray coating, dipping or by using a bar coater, roll coater or gravure coater.

Further, the drying or heat treatment is conducted by oven drying (heating), infrared ray heating or high-frequency heating.

(Gas Barrier Laminates)

The gas barrier laminate produced by the production method of the invention comprises two layers formed on at least one surface of the plastic base material (P), the undercoating (A) formed on the plastic base material being a coating closely and excellently adhering onto the plastic base material. On the undercoating is formed the barrier layer (B) in which the carboxyl groups of the polycarboxylic acid polymer being crosslinked with polyvalent metal ions to a ratio of not less than 20% and, specifically, not less than 30%.

When the barrier layer (B) is blended with the crosslinking agent, further, the crosslinked structure by covalent bond is formed among the carboxyl groups of the polycarboxylic acid polymer and, specifically, an ester bond or an amide ester bond is formed so that the barrier layer exhibits very excellent resistance against the hot water.

In the gas barrier laminate produced by the production method of the present invention, the barrier layer itself exhibits gas barrier property to a sufficient degree, i.e., gas barrier property and retort resistance of as excellent as an oxygen permeation amount (in compliance with the JIS K-7126) of less than 0.3 cm$^3$/m$^2$·day·atm. (in an environment of 25° C.-80% RH) before the retort treatment and an oxygen permeation amount of less than 0.7 cm$^3$/m$^2$·day·atm. (in an environment of 25° C.-80% RH) even after the retort treatment. In the tests shown in Examples described below, further, the gas barrier laminates were evaluated for their flexibilities in terms of the oxygen permeation amount after the retort treatment and after crushed 200 times by using the Gelboflex tester to find that the flexibilities were as excellent in terms of the oxygen permeation amount as less than 10 cm$^3$/m$^2$·day·atm. (in an environment of 25° C.-80% RH). As a result, it was found that the gas barrier laminates also possessed excellent interlayer adhesion without developing interlayer peeling.
(Packing Materials)

Figure 4:
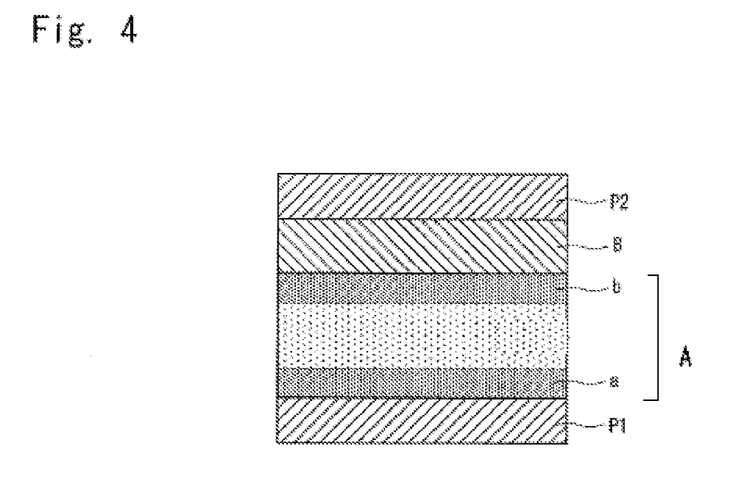
FIG. 4 is a view showing a packing material of the present invention.

The packing material according to the invention may just be the gas barrier laminate of the invention obtained by forming the undercoating (A) and the barrier layer (B) on at least one surface of the above-mentioned various kinds of plastic base materials (P). Preferably, however, the packing material of the invention comprises, as shown in FIG. 4, the gas barrier laminate of the invention that has the undercoating (A) and the barrier layer (B) formed on a plastic base material (P1), and, further, has a plastic base material (P2) on the barrier layer (B) sandwiching the undercoating (A) and the barrier layer (B) as intermediate layers.

EXAMPLES

The invention will be further described by way of the following Examples by which, however, the invention is in no way limited.
(Oxygen Permeation Amount)

The amount of oxygen that permeates through the laminate of the obtained plastic films was measured by using an oxygen permeation amount-measuring instrument (OX-TRAN 2/20 manufactured by Modern Control Co.). The oxygen permeation amount was, further, measured after the retort sterilization treatment of 121° C.-30 minutes. The measurement was taken under the conditions of an environmental temperature of 25° C. and a relative humidity of 80%.
(Amount of Nitrogen that is Present)

The amount of nitrogen present relative to the total amount of carbon, oxygen and nitrogen in each of the regions was measured according to the methods described below.
Region (b): The obtained plastic film was dipped in an alkaline aqueous solution to dissolve the layer (B), and the composition of the exposed surface was analyzed by the XPS.
Coating (A): The obtained plastic film was cut aslant, and the composition of the cut region was analyzed by the XPS.
Region (a): The laminate of the obtained plastic film was mechanically peeled along the interface between the polyethylene terephthalate film P that is the base material and the undercoating A, and the composition of the surface of the exposed undercoating A was analyzed by the XPS.
Layer (C): The surface of the obtained plastic film was analyzed by the XPS.
(Ionic Crosslinking Ratio)

The ionic crosslinking ratio was calculated by using the gas barrier laminate after ionically crosslinked and by using a Fourier transform infrared spectrophotometer. Upon the formation of the ionic crosslinking, the carboxylic acid was converted into the carboxylate. Usually, it has been known that the carboxylic acid has characteristic absorption bands at wavelengths near 920 to 970 cm$^{-1}$, near 1700 to 1710 cm$^{-1}$ and near 2500 to 3200 cm$^{-1}$ and that the acid anhydride thereof has it at the wavelengths near 1770 to 1800 cm$^{-1}$. Further, it has been known that the carboxylate has a characteristic absorption band at wavelengths near 1480 to 1630 cm$^{-1}$. The ionic crosslinking ratio was calculated by using peak heights of the carboxylic acid and the acid anhydride thereof that have vertexes in the wavelength region of 1600 to 1800 cm$^{-1}$, and by using a peak height of the carboxylate that has a vertex in the wavelength of 1480 to 1630 cm$^{-1}$. More desirably, there are used peak heights of those having vertexes in the wavelength regions of (i) 1695 to 1715 cm$^{-1}$ and (ii) 1540 to 1610 cm$^{-1}$. The peak heights are obtained by detecting the infrared absorption spectra of the samples and by measuring the absorbencies at the wavelengths of (i) and (ii). The carboxylic acid and the carboxylates are regarded to have the same coefficient of absorbency, and the ratio of conversion of the carboxyl groups into the salt thereof (ratio by which the carboxylic acid was converted into the carboxylate thereof) was calculated, i.e., the ionic conversion ratio X was calculated according to the following formula (I), $$X = \text{Peak height of } (ii)/[\text{peak height of } (i) + \text{peak height of } (ii)] \quad (1)$$

where the peak heights of (i) and (ii) are the differences in the absorbencies between the peak points and the points at where the hems of peaks are overlapping the base line.
(Measuring Conditions of the Fourier Transform Infrared Spectrophotometer)

Instrument used: FTS 7000 Series, manufactured by Digilab Co.
Measuring method: One-time reflection method using a germanium prism.
Measuring wavelength region: 4000 to 700 cm$^{-1}$
(Evaluating the Interlayer Adhesion)

The laminate of the obtained plastic films was folded, fixed and was preserved in a state of being dipped in water of 20 to 25° C. Thereafter, the gas barrier laminate was taken out from the water and was checked for the occurrence of peeling at the folded portion. The interlayer adhesion was regarded to be X when there were one or more peeled portions after preserved for 3 days, was regarded to be ○ when there was no peeling after preserved for 3 days but were one or more peeled portions after preserved for one week, and was regarded to be ⊚ when there was quite no peeling portion after preserved for one week.
(Evaluating the Flexibility)

The laminate of the obtained plastic films was subjected to the retort sterilization treatment of 121° C.-30 minutes, was cut into a size of 130 mm ×100 mm, formed into a cylinder of 30 mm ø and 130 mm long, and was attached to the Gelboflex tester. By using the Gelboflex tester, the crush treatment was conducted 200 times in an environment of a temperature of 23° C. and a relative humidity of 50% RH. One time of the crush treatment consisted of a twisting motion (twisting angle of 180° C. and a moving length of 60 mm) and a horizontal motion (moving length of 20 mm). Thereafter, the oxygen permeation amount was measured in a manner as described above.

Example 1

To a mixed solvent of ethyl acetate/MEK (weight ratio of 65/35) in which there had been dissolved two kinds of polyester polyols at a weight ratio of 50/50, Vylon V200 (non-aqueous resin containing no metal element in the resin skeleton thereof: confirmed by fluorescent X-ray, manufactured by Toyo Boseki Co.) and Vylon GK570 (non-aqueous resin containing a metal element in the resin skeleton thereof: confirmed by fluorescent X-ray, manufactured by Toyo Boseki Co.), there was so added a calcium carbonate (CS3N-A manufactured by Ube Materials Co., primary grain size: 0.3 µm) that the amount thereof was 400% by weight relative thereto so that the total solid content was 35%, and the mixture was dispersed in a mill by using glass beads (BZ-04 manufactured by Toshinriko Co.) to obtain a paste thereof. To the paste, there were added a straight chain aliphatic polyisocyanate (Sumidur N3300 manufactured by Sumika Bayer Urethane Co., isocyanulate type based on a 1,6-hexamethylene diisocyanate, solid content of 100%, Tg=−60° C., Mn=680) in an amount of 20% by weight relative to the polyester polyol and an alicyclic polyisocyanate (Desmodur Z4470 manufactured by Sumika Bayer Urethane Co., isocyanulate type based on an isophorone diisocyanate, dissolved in butyl acetate, solid content of 70%, Tg=70° C., Mn=1200) in such an amount that the weight thereof exclusive of the solvent was 20% by weight relative to the polyester polyols, and the mixture was dissolved in the above mixed solvent so that the total solid content was 25% by weight to thereby obtain a coating solution (A") comprising the coating composition (A') containing the alkaline compound of the polyvalent metal.

By using a bar coater, the coating solution (A") was applied onto a biaxially stretched polyethylene terephthalate film P having a thickness of 12 μm, and was heat-treated in a box-type electric oven under the conditions of a temperature set at 70° C. for a treating time of 2 minutes to obtain a polyethylene terephthalate film having a layer A corresponding to the layer (A) of an applied amount of 1.4 g/m$^2$.

A polyacrylic acid (AC-10LP, Mn=25000, manufactured by Toa Gosei Co.) as the polycarboxylic acid polymer was dissolved in a water/acetone mixed solvent (weight ratio of 50/50) in such an amount that the solid content thereof was 10% by weight to obtain the solution (B').

By using the bar coater, the solution (B') was applied onto the layer A of the polyethylene terephthalate film that possessed the layer A so that the amount applied thereof was 1.5 g/m$^2$ to form a precursor layer (BO). Here, the applied amount of the precursor layer (BO) stands for the applied amount found by directly applying the solution (B') onto the biaxially stretched polyethylene terephthalate film and drying it, i.e., drying the polyacrylic acid only in the solution (B') without causing the ionic crosslinking to be formed. The film after applied was heat-treated in a conveyer-type electric oven under the conditions of a temperature set at 60° C. and a pass time of 5 seconds to form a polyethylene terephthalate film having, on the layer A, a layer B forming the ionic crosslinking in the precursor layer (BO), i.e., to obtain a gas barrier laminate.

Figure 5:
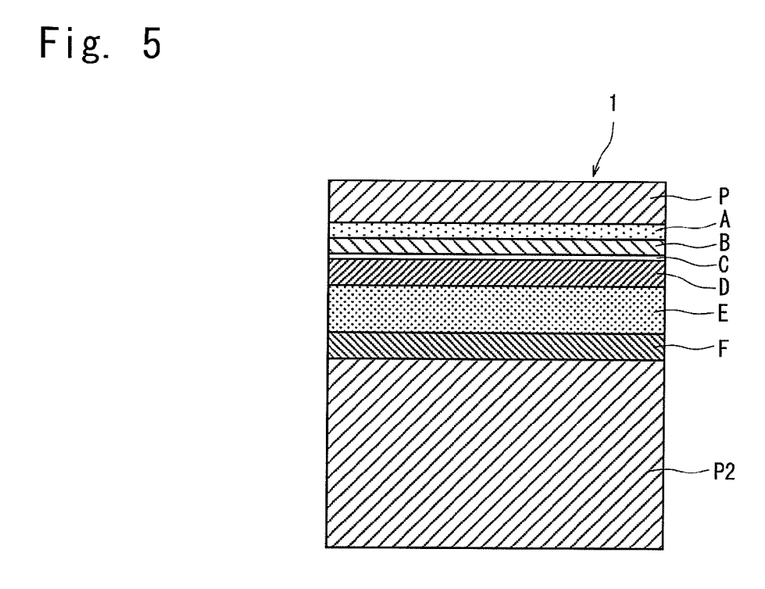
FIG. 5 is a view showing an embodiment of the gas barrier laminate of the present invention.

With the coating of the gas barrier laminate as the lower layer, there were further laminated a layer D of an urethane adhesive of a thickness of 2 μm, a biaxially stretched nylon film E of a thickness of 15 μm, a layer F of an urethane adhesive of a thickness of 2 μm and an unstretched polypropylene film P2 of a thickness of 70 μm, successively, to obtain a laminate 1 of a layer constitution as shown in FIG. 5.

Example 2

A laminate was obtained by the same method as that of Example 1 but adjusting the amount of the straight chain aliphatic polyisocyanate in the coating solution (A") to be 30% by weight relative to the polyester polyols and adjusting the amount of the alicyclic polyisocyanate exclusive of the solvent to be 30% by weight relative to the polyester polyols.

Example 3

A laminate was obtained by the same method as that of Example 1 but adjusting the amount of the straight chain aliphatic polyisocyanate in the coating solution (A") to be 12% by weight relative to the polyester polyols and adjusting the amount of the alicyclic polyisocyanate exclusive of the solvent to be 12% by weight relative to the polyester polyols.

Example 4

A laminate was obtained by the same method as that of Example 1 but adjusting the amount of the straight chain aliphatic polyisocyanate in the coating solution (A") to be 10% by weight relative to the polyester polyols and adjusting the amount of the alicyclic polyisocyanate exclusive of the solvent to be 50% by weight relative to the polyester polyols.

Example 5

A laminate was obtained by the same method as that of Example 1 but adjusting the amount of the straight chain aliphatic polyisocyanate in the coating solution (A") to be 30% by weight relative to the polyester polyols and adjusting the amount of the alicyclic polyisocyanate exclusive of the solvent to be 20% by weight relative to the polyester polyols.

Example 6

A laminate was obtained by the same method as that of Example 1 but using Vylon 550 (non-aqueous resin containing no metal element in the resin skeleton thereof: confirmed by fluorescent X-ray, manufactured by Toyo Boseki Co.) instead of Vylon GK570 in the coating solution (A") and adjusting the weight ratio of the composition of the water/acetone mixed solvent in the solution (B') to be 80/20.

Example 7

A laminate was obtained by the same method as that of Example 1 but using a polyacrylic acid 10-LHP (manufactured by Toa Gosei Co., Mn=250,000) in an amount of 20% by weight instead of using the polyacrylic acid 10-LP in the solution (B').

Example 8

A laminate was obtained by the same method as that of Example 1 but partly neutralizing 10 mol % of the carboxyl groups of the polyacrylic acid in the solution (B') with the sodium hydroxide.

Example 9

A laminate was obtained by the same method as that of Example 1 but adjusting the weight ratio of the composition of the water/acetone mixed solvent in the solution (B') to be 20/80.

Example 10

A laminate was obtained by the same method as that of Example 1 but adjusting the weight ratio of the composition of the water/acetone mixed solvent in the solution (B') to be 80/20.

Example 11

Figure 6:
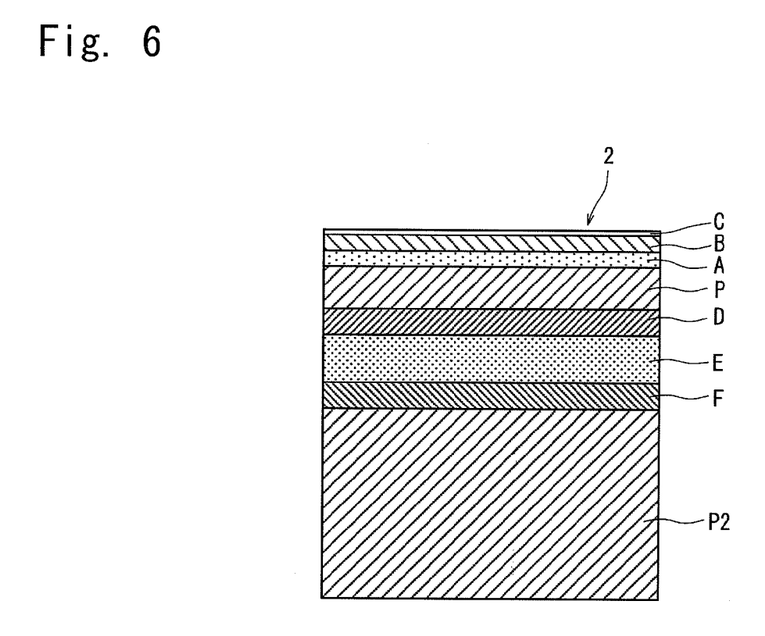
FIG. 6 is a view showing another embodiment of the gas barrier laminate of the present invention.

A laminate 2 of a layer constitution shown in FIG. 6 was obtained by placing the coating as the outer layer instead of placing the coating as the lower layer in the gas barrier laminate of Example 1 and successively laminating thereon an urethane adhesive layer D of a thickness of 2 μm, a biaxially stretched nylon film E of a thickness of 15 μm, an urethane adhesive layer F of a thickness of 2 μm and an unstretched polypropylene film P2 of a thickness of 70 μm.

Example 12

A laminate was obtained by the same method as that of Example 1 but using the calcium hydroxide (manufactured by Wako Jun-yaku Co.) instead of the calcium carbonate in the coating solution (A″), and applying the layer (A) in an amount of 1.1 g/m².

Example 13

A laminate was obtained by the same method as that of Example 1 but using the magnesium carbonate (manufactured by Wako Jun-yaku Co.) instead of the calcium carbonate in the coating solution (A″), and applying the layer (A) in an amount of 1.2 g/m².

Example 14

A laminate was obtained by the same method as that of Example 1 but using, as the straight chain aliphatic polyisocyanate in the coating solution (A″), Sumidur N3790 (isocyanulate type based on the 1,6-hexamethylene diisocyanate, solid content of 90%, Tg=−55° C., Mn=970, manufactured by Sumika Bayer Urethane Co.) instead of Sumidur N3300 in an amount exclusive of solvent of 20% by weight relative to the polyester polyols.

Example 15

A laminate was obtained by the same method as that of Example 1 but using, as the straight chain aliphatic polyisocyanate in the coating solution (A″), Sumidur HT (adduct type based on the 1,6-hexamethylene diisocyanate, solid content of 75%, Tg=−50° C., Mn=950, manufactured by Sumika Bayer Urethane Co.) instead of Sumidur N3300 in an amount exclusive of solvent of 20% by weight relative to the polyester polyols.

Example 16

A laminate was obtained by the same method as that of Example 1 but using Takenate D110N (adduct type based on the xylenediisocyanate, solid content of 75%, manufactured by Mitsui Kagaku Co.) instead of Desmodur Z4470 in the coating solution (A″) in an amount exclusive of solvent of 20% by weight relative to the polyester polyols.

Example 17

A laminate was obtained by the same method as that of Example 1 but using Techbarrier TX (silica-deposited barrier film manufactured by Mitsubishi Jushi Co.) instead of using the biaxially stretched polyethylene terephthalate film of a thickness of 12 μm on which the coating solution (A″) was applied in Example 1, and applying the coating solution (A″) onto the barrier coating surface thereof.

Comparative Example 1

A laminate was obtained by the same method as that of Example 1 but adding no alicyclic polyisocyanate to the coating solution (A″) and adding the straight chain aliphatic polyisocyanate in an amount of 60% by weight relative to the polyester polyols.

Comparative Example 2

A laminate was obtained by the same method as that of Example 1 but adjusting the amount of the straight chain aliphatic polyisocyanate in the coating solution (A″) to be 20% by weight relative to the polyester polyols and adjusting the amount of the alicyclic polyisocyanate exclusive of the solvent to be 5% by weight relative to the polyester polyols.

TABLE 1

| | Layer (A) containing alkaline compound of polyvalent metal | | | | | | | | |
|---|---|---|---|---|---|---|---|---|---|
| | Non-aq. resin | | | *1 | | | | Alkaline comp. of polyvalent metal | |
| | *3 | *3 | *3 | Aliphatic | | | *2 | | Equivalent |
| | 200 | GK570 | 550 | *4 | *5 | *6 | *7 | *8 Kind & amount | (eq) |
| Ex. 1 | 50 | 50 | | 20 | | | 20 | Ca carbonate 200 | 0.9 |
| Ex. 2 | 50 | 50 | | 30 | | | 30 | Ca carbonate 200 | 0.9 |
| Ex. 3 | 50 | 50 | | 12 | | | 12 | Ca carbonate 200 | 0.9 |
| Ex. 4 | 50 | 50 | | 10 | | | 50 | Ca carbonate 200 | 0.9 |
| Ex. 5 | 50 | 50 | | 30 | | | 20 | Ca carbonate 200 | 0.9 |
| Ex. 6 | 50 | | 50 | 20 | | | 20 | Ca carbonate 200 | 0.9 |
| Ex. 7 | 50 | 50 | | 20 | | | 20 | Ca carbonate 200 | 0.9 |
| Ex. 8 | 50 | 50 | | 20 | | | 20 | Ca carbonate 200 | 0.9 |
| Ex. 9 | 50 | 50 | | 20 | | | 20 | Ca carbonate 200 | 0.9 |
| Ex. 10 | 50 | 50 | | 20 | | | 20 | Ca carbonate 200 | 0.9 |
| Ex. 11 | 50 | 50 | | 20 | | | 20 | Ca carbonate 200 | 0.9 |
| Ex. 12 | 50 | 50 | | 20 | | | 20 | Ca hydroxide 200 | 0.9 |
| Ex. 13 | 50 | 50 | | 20 | | | 20 | Mg carbonate 200 | 0.9 |
| Ex. 14 | 50 | 50 | | | 20 | | 20 | Ca carbonate 200 | 0.9 |
| Ex. 15 | 50 | 50 | | | | 20 | 20 | Ca carbonate 200 | 0.9 |
| Ex. 16 | 50 | 50 | | 20 | | | | 20 Ca carbonate 200 | 0.9 |
| Ex. 17 | 50 | 50 | | 20 | | | 20 | Ca carbonate 200 | 0.9 |

TABLE 1-continued

| | | | | | | |
|---|---|---|---|---|---|---|
| Comp. Ex. 1 | 50 | 50 | 60 | | Ca carbonate 200 | 0.9 |
| Comp. Ex. 2 | 50 | 50 | 20 | 5 | Ca carbonate 200 | 0.9 |

| | Precursor layer (B0) | | | | | |
|---|---|---|---|---|---|---|
| | Polyacrylic acid | | Polyacrylic acid partly neutralized | Solvent composition (wt ratio) | | Remarks |
| | AC-10LP | AC-10LHP | | Water | Acetone | |
| Ex. 1 | 100 | | no | 50 | 50 | |
| Ex. 2 | 100 | | no | 50 | 50 | |
| Ex. 3 | 100 | | no | 50 | 50 | |
| Ex. 4 | 100 | | no | 50 | 50 | |
| Ex. 5 | 100 | | no | 50 | 50 | |
| Ex. 6 | 100 | | no | 80 | 20 | *9 |
| Ex. 7 | 80 | 20 | no | 50 | 50 | |
| Ex. 8 | 100 | | yes | 50 | 50 | |
| Ex. 9 | 100 | | no | 20 | 80 | |
| Ex. 10 | 100 | | no | 80 | 20 | |
| Ex. 11 | 100 | | no | 50 | 50 | *10 |
| Ex. 12 | 100 | | no | 50 | 50 | |
| Ex. 13 | 100 | | no | 50 | 50 | |
| Ex. 14 | 100 | | no | 50 | 50 | |
| Ex. 15 | 100 | | no | 50 | 50 | |
| Ex. 16 | 100 | | no | 50 | 50 | |
| Ex. 17 | 100 | | no | 50 | 50 | *11 |
| Comp. Ex. 1 | 100 | | no | 50 | 50 | |
| Comp. Ex. 2 | 100 | | no | 50 | 50 | |

*1: Isocyanate type curing agent,
*2: Alicyclic,
*3: Vylon,
*4: Sumidur N3300 (HDI nulate),
*5: Desmodur N3790 (HDI nulate),
*6: Sumidur HT (HDI adduct),
*7: Desmodur Z4470 (IPDI nulate),
*8: Takenate D110N (XDI adduct)
*9: Non-aq. resin contains no metal
*10: Coating is on the surface of laminate
*11: Coating on the deposited film Table 2 shows the measured results of the ionic crosslinking ratios of the gas barrier laminates obtained in the above Examples and Comparative Examples, amounts of nitrogen relative to the total amounts of carbon, oxygen and nitrogen in the region (b), layer (A), region (a) and layer (C) as found by analyzing the compositions thereof by the XPS, interlayer adhesion of the obtained laminates, oxygen permeation amounts before and after the retort treatment, and oxygen permeation amounts after the retort treatment and after the crush treatment conducted 200 times by using the Gelboflex tester that represented the evaluation of flexibility.

Though favorable barrier properties were exhibited in all of the cases, favorable flexibility and favorable interlayer adhesion were exhibited in Examples only.

TABLE 2

| | | Amount of nitrogen by XPS (atom %) | | | | | Oxygen permeation amount (cm³/m² · day · atm)$^{note\ 1}$ | | | |
|---|---|---|---|---|---|---|---|---|---|---|
| | *1 | Region (b) | Layer (A) | Region (a) | Layer (C) | *2 | Flexibility *3 | *4 | *5 | Remarks |
| Ex. 1 | 61 | 5.5 | 3.7 | 5.2 | 3.2 | ◎ | 2.8 | <0.05 | <0.05 | |
| Ex. 2 | 60 | 6.7 | 3.9 | 6.2 | 4.5 | ◎ | 1.9 | <0.05 | <0.05 | |
| Ex. 3 | 63 | 3.3 | 2.1 | 3.2 | 2.4 | ◎ | 3.5 | <0.05 | <0.05 | |
| Ex. 4 | 63 | 8.0 | 4.1 | 6.7 | 2.2 | ◎ | 5.6 | <0.05 | <0.05 | |
| Ex. 5 | 62 | 5.2 | 4.0 | 5.1 | 5.2 | ◎ | 4.5 | <0.05 | <0.05 | *6 |
| Ex. 6 | 60 | 5.3 | 3.9 | 5.1 | 3.5 | ◎ | 8.2 | <0.05 | <0.05 | |
| Ex. 7 | 58 | 5.4 | 3.8 | 5.0 | 2.4 | ◎ | 2.5 | <0.05 | <0.05 | |
| Ex. 8 | 66 | 5.6 | 3.9 | 5.2 | 3.1 | ◎ | 3.0 | <0.05 | <0.05 | |
| Ex. 9 | 40 | 5.2 | 3.8 | 5.1 | 13.0 | ◎ | 5.5 | <0.05 | <0.05 | |
| Ex. 10 | 80 | 5.7 | 3.9 | 5.2 | 1.2 | ◎ | 3.2 | <0.05 | <0.05 | |
| Ex. 11 | 62 | 5.5 | 3.8 | 5.1 | 3.2 | ○ | 6.0 | <0.05 | <0.05 | *7 |
| Ex. 12 | 63 | 5.5 | 3.9 | 5.3 | 3.2 | ◎ | 4.5 | <0.05 | 0.10 | |
| Ex. 13 | 61 | 5.4 | 3.8 | 5.3 | 3.2 | ◎ | 4.1 | <0.05 | 0.08 | |
| Ex. 14 | 62 | 5.4 | 3.8 | 5.0 | 2.8 | ◎ | 4.5 | <0.05 | <0.05 | |
| Ex. 15 | 64 | 4.2 | 2.9 | 4.1 | 3.0 | ○ | 4.6 | <0.05 | <0.05 | |
| Ex. 16 | 63 | 4.6 | 3.3 | 4.4 | 2.8 | ○ | 5.0 | <0.05 | <0.05 | |
| Ex. 17 | 62 | 5.4 | 3.6 | 5.2 | 3.3 | ◎ | 2.0 | <0.05 | <0.05 | *8 |

TABLE 2-continued

| | | Amount of nitrogen by XPS (atom %) | | | | Oxygen permeation amount (cm³/m²·day·atm)[note 1] | | | | |
|---|---|---|---|---|---|---|---|---|---|---|
| | *1 | Region (b) | Layer (A) | Region (a) | Layer (C) | *2 | Flexibility *3 | *4 | *5 | Remarks |
| Comp. Ex. 1 | 62 | 5.0 | 6.0 | 6.2 | 8.7 | X | 10.3 | <0.05 | <0.05 | |
| Comp. Ex. 2 | 61 | 3.2 | 3.4 | 3.4 | 1.4 | X | 13.0 | <0.05 | 0.10 | |

*1: Ionic crosslinking ratio %,
*2: Interlayer adhesion,
*3: After retort and 200 times of crushing,
*4: Oxygen permeation amount before retort,
*5: Oxygen permeation amount after retort,
*6: Non-aq. resin contains no metal,
*7: Coating is on the surface of laminate,
*8: Coating on the deposited film
[note 1] Oxygen permeation amount: Favorable if the permeation amount is less than 0.3 cm³/m²·day·atm. before the retort treatment, is less than 0.7 cm³/m²·day·atm. after the retort treatment, and is less than 10 cm³/m²·day·atm. after the retort treatment and after 200 times of the crush treatment by using the Gelboflex tester.

INDUSTRIAL APPLICABILITY

The gas barrier laminate of the present invention has excellent gas barrier property, waterproof property, retort resistance that is capable of achieving excellent barrier property even after placed under high temperature and wet heated conditions such as retort sterilization and, further, exhibits particularly excellent flexibility and interlayer adhesion lending itself well for use as packing materials that require flexibility, such as films, sheets and pouches.

The invention claimed is:

1. A gas barrier laminate having:
an undercoating (A) which comprises a main resin, an isocyanate curing agent and an alkaline compound of a polyvalent metal; and
a barrier layer (B) of a polycarboxylic acid polymer in which an ionic crosslinking is formed due to the polyvalent metal among the carboxyl groups;
which are formed on at least one surface of a plastic base material,
wherein said main resin is a polyester polyol, and said isocyanate curing agent is a combination of a straight chain aliphatic isocyanate compound and an alicyclic isocyanate compound having an alicyclic ring structure in the skeleton thereof or an isocyanate compound having an aromatic ring, and
wherein a layer (b) free of the alkaline compound of the polyvalent metal is formed in said undercoating (A) on the side of the barrier layer (B), the content of nitrogen in said layer (b) being larger than the content of nitrogen in said undercoating (A) other than the layer (b).

2. The gas barrier laminate according to claim 1, wherein a layer (a) free of the alkaline compound of the polyvalent metal is formed in said undercoating (A) on the side of the plastic base material, the content of nitrogen in said layer (a) being larger than the content of nitrogen in said undercoating (A) other than the layers (b) and (a).

3. The gas barrier laminate according to claim 2, wherein the content of nitrogen is not less than 2 atom % relative to the total amount of carbon, oxygen and nitrogen in said undercoating (A) other than the layers (a) and (b), and the content of nitrogen relative to the total amount of carbon, oxygen and nitrogen in the layers (a) and (b) is larger, by not less than 1 atom %, than the content of nitrogen in said undercoating (A) other than the layers (a) and (b).

4. The gas barrier laminate according to claim 1, wherein nitrogen is present in an amount of 1 to 14 atom % in the surface of said barrier layer (B) on the side opposite to the undercoating (A).

5. The gas barrier laminate according to claim 1, wherein said aliphatic isocyanate compound and said alicyclic isocyanate compound are at a weight ratio of 60:40 to 15:85.

6. The gas barrier laminate according to claim 1, wherein said aliphatic isocyanate compound has an isocyanurate structure.

7. The gas barrier laminate according to claim 1, wherein said polycarboxylic acid polymer is a poly(meth)acrylic acid or a partly neutralized product thereof.

8. The gas barrier laminate according to claim 1, wherein said alkaline compound of the polyvalent metal comprises at least one of a carbonate of calcium or magnesium, or a hydroxide thereof.

9. A packing material comprising the gas barrier laminate of claim 1 and having a plastic base material on the barrier layer of said gas barrier laminate on the side opposite to the undercoating.

10. A method of producing a gas barrier laminate by:
applying a coating composition which comprises a main resin, an isocyanate curing agent which includes a straight chain aliphatic isocyanate compound and an alicyclic isocyanate compound having an alicyclic ring structure in the skeleton thereof, and an alkaline compound of a polyvalent metal, onto a plastic base material;
volatilizing the solvent by heat treatment and, thereafter;
applying thereon a coating material that contains a polycarboxylic acid polymer;
wherein said aliphatic isocyanate compound has a glass transition temperature (Tg) of not higher than −20° C. and a number average molecular weight (Mn) of not more than 1,200, and said alicyclic isocyanate compound has a glass transition temperature (Tg) of not lower than 50° C. and a number average molecular weight (Mn) of not less than 400.

* * * * *